United States Patent Office 2,811,454
Patented Oct. 29, 1957

2,811,454

MEAT WRAPPING SHEET

Ralph Pressman, Sierra Madre, Calif., assignor of twenty-five percent to Norman Dartell, Los Angeles, Calif.

No Drawing. Application August 16, 1954,
Serial No. 450,257

7 Claims. (Cl. 99—171)

This invention relates to food wrapping materials, and particularly to wrappers for meats for storage and/or freezing purposes.

Heretofore such wrapping sheets have been used as water-repellent or -impervious sheets for display, storage or freezing purposes. The present invention, however, extends the utility of said wrappers by combining a preservative, tenderizing and anti-oxidant effect with the said protective action. Such protective action merely seals the foods against dust and moisture, or prevents loss of water, as the case may be. However, my invention provides a coating to the same which has various effects upon the foods so protected and which coating will tenderize, anti-oxidize, or otherwise preserve the foods in contact with it. Thus, the wrapping media will gain added functions to expand their utility.

The protective wrappers heretofore used are films or sheets of either the transparent type, such as polyethylene film, or of the semi-transparent type, such as parchment or waxed paper, or of the opaque type, such as metallic foil, or a film formed in situ on the food by spraying. The purpose of such wrapping media is to package meats, fish and game to retard or prevent spoilage and dehydration or hydration, and/or that they may be kept in a deep freeze for reasonably extended periods without damage to the foods.

According to this invention, I propose to coat the said wrapping sheets with substances having various effects on the foods to be contained therein, as will be later described, and to prepare said coating so that it will be adherent and elastic under the various conditions of use. In the specific examples to be shown later, I have provided the said coating on the wrapping medium so as to have a tenderizing and flavoring action upon the food with which it comes in contact. Other applications will be indicated for those versed in the art.

The example of a coating here referred to contains a suspension of a proteolytic enzyme or its derivates in admixture with certain ingredients to maintain its activity, and an activator and anti-oxidant, which enzyme is held in colloidal suspension in an adhesive medium to adhere to the wrapping sheet without substantial loss of its enzymatic activity.

The tenderizing action on meat of proteolytic enzymes springs from their ability to attack proteins, proteoses and peptones, changing them into easily digestible polypeptides and amino acids. There are several such enzymes known: Papain, rennin, pepsin, trypsin, the class of Protaminases and Polypeptases. Of these enzymes, particularly for meat tenderizing, I prefer papain as a practical source, owing to its availability on the open market and its comparative abundance. I prefer to use the latex of the fruit of *Carioca papaya*, or other fruits containing papain, as my enzyme source without separating the chemically pure papain. To prepare the papain of the market, I set out to standardize its potency and use it in proportion to its activity or potency. Usually about 8% to 12% papain is sufficient in the coating.

I experienced difficulties in producing an adherent and flexible coating of the papaya suspension on the water-repellent or -impervious sheeting, and only after prolonged trials found conditions that made the composition workable. To produce reliable adherence and flexibility of the coating defying embrittlement in creasing and at freezing temperatures, I found that algin or the salts of alginic acid added in proportion of 0.1% to 0.3% to the coating produced a desired film. Of the various adhesives usable—acacia, gum tragacanth, karaya, locust bean, Irish moss, polyvinyl pyrrolidine, carboxymethyl-cellulose, gelatine, agar—I have found the alginates as best suitable. However, any of the other adhesives may be used with the proper adjustment of the ingredient proportions.

The activity of proteolytic enzymes declines with age until eventually they become totally inactive. I have found it necessary to overcome this condition by the addition of an anti-oxidant. In the case of papain, which is used as a proteolytic enzyme in the example herein shown, I have found ascorbic acid to be the most effective anti-oxidant, which I use in 4% to 6% proportion of the coating formula. A simultaneous and vital role of ascorbic acid is that of reducing the pH of the coating solution (suspension) because in the given example the enzyme works best at 3.5 to 4.0 pH, which the said addition of ascorbic acid brings about. Other enzymes or combinations of enzymes will show other pH minimums for maximum activity, but in any case the pH should be below 4.5.

To promote increased osmotic diffusion rates of the enzymes from the coating into the wrapped products, I have found it expedient to add salt to the coating. Such addition is especially useful during the defrosting or thawing stage when the diffusion of fluids is at its lowest rate.

Another addition to said coating is made for the purpose of preserving the solution equilibrium during the osmosis of the highly saline enzyme solution, which addition also enhances the flavor of food products. This addition is mono-sodium- or potassium-glutamate.

The activity of enzymes is influenced by:

(1) *Temperature.*—The velocity of action increases with rising temperature to an optimum, after which it again declines.

(2) *pH.*—The activity usually follows a curve up to an optimum of pH, and is also dependent on the temperature.

(3) *Activators.*—The pH-curve of activity velocity is greatly affected by the presence of certain specific activators.

In the example shown here of an enzyme coating, I have used cysteine hydrochloride as an activator in 0.1–0.3% weight proportion of the coating formula.

After compounding the various ingredients into a coating suspension, it is applied in a thin film over the wrapping medium on one side (paper, film, metal foil, etc.) and after the said coating has set, the coated wrapping sheet is ready for use. Or, the film coating may be sprayed or dipped onto the food and set into a rigid layer in situ, the enzyme agent being a component of said coating film.

If an active coating is employed only on one side of the wrapping sheet, the active coat is to be arranged next to the product to be wrapped.

An example of the use of my invention will be shown below, where the active coating adhering to the wrapping sheet is a proteolytic enzyme, in particular papain, which coating produces a tenderizing and flavor-increasing effect upon meats, fish and game wrapped in said wrapping medium for the protection thereof during and after the freezing and/or storage of said meat. The overall formula for such active coating is:

| | Grams |
|---|---|
| Papain | 8 to 12 |
| Sodium chloride (salt) | 20 to 30 |
| Ascorbic acid | 4 to 6 |
| Cysteine hydrochloride | 0.1 to 0.3 |
| Mono sodium glutamate | 1 to 2 |
| Sodium alginate | 0.1 to 0.3 |
| Water to make 100 ml. | |

This formula is to be varied according to type of wrapping sheet and the commercial demand as to activity duration and completion. It is also pointed out that the amount of enzyme used determines the price of the coating and also its effectiveness. I have here given the formula which I believe will meet competitive products. A lower papain content will do some tenderizing, but a larger amount is needed to be effective for practical needs. On the other hand, too much papain will digest the meat to a state of fluidity which will make the thawed package unsightly and the loss through liquid run-off will be a serious handicap. Also, an increase in the glutamate addition will cause some added flavor, but it will be a detriment to the solution equilibrium during diffusing. The scientific explanations given here are according to my best understanding of the phenomena here encountered, and may or may not be correct; however, the material behavior warrants the propounding of such hypothesis.

It is admitted that tenderizing powders with proteolytic enzymes have been known and have been on the open market, for a number of years. It is also admitted that mono sodium glutamate is a well known and used flavor-effecting agent, and that ascorbic acid is well known in vitamin therapy. However, to my knowledge, no one has heretofore thought of combining a proteolytic enzyme with an adherent coating onto a wrapping sheet for the purpose of beneficially affecting the wrapped products, especially in connection with deep freezing and thawing, and affecting said products by diffusion of its active components in the following manner (simultaneously or in succession): enzymatic tenderization of proteins, addition of a pH-reducing agent, an anti-oxidant, an enzyme-activator, pure salt as a diffusion rate augmenter, increasing flavor potential while stabilizing solution equilibrum, and finally, addition of an adhesion agent to promote suspension and adherence of the coated layer to the wrapping sheet.

As to the advantages of my invention in the food preserving and packaging industry, and particularly in the deep freezing of foods, let it be pointed out that the use of pre-coated wrapping sheets containing enzymatic agents will produce a more uniform and consistent tenderizing or preservative effect than the customary hand-sprinkling or -spraying, not to speak of the reduced cost by eliminating one or more handling steps.

Furthermore, my invention may be used in many other ways besides those shown in the specific examples hereinabove. The coating of the wrapping sheet may contain other ingredients that affect products in one or more ways. Thus, the coating may contain one or more components to affect the wrapped products by anti-enzymatic-, sugar reversion-, humefacting-, anti-hydrating-, bacteriophagic-, antiseptic-, insecticide-, fungicide-, insect-repellent-, growth hormone-, and many other agencies.

Having thus described the invention, what is claimed and desired to be secured by Letters Patent is:

1. A meat wrapping sheet for use in wrapping meats for frozen storage comprising a moisture-impervious sheet, having on a surface thereof adapted to be placed in contact with an underlying surface of a meat product, an adherent coating comprising about 8% to about 12% by weight of a proteolytic enzyme in an aqueous solution containing 20% to 30% salt, 1% to 2% of a glutamate, 4% to 6% of ascorbic acid and 0.1% to 0.3% of an edible adhesive agent, said coating providing a tenderizing action on said meat product after thawing.

2. The meat wrapping sheet of claim 1 in which said sheet is of polyethylene.

3. The meat wrapping sheet of claim 1 in which the enzyme is papain.

4. The meat wrapping sheet of claim 1 in which the glutamate is monosodium glutamate.

5. A moisture impervious sheet for wrapping meats for storage at freezing temperatures, having, on a surface thereof adapted to be placed in contact with the meat, a coating comprising:

| | Percent |
|---|---|
| A proteolytic enzyme | 8 to 12 |
| Salt | 20 to 30 |
| Ascorbic acid | 4 to 6 |
| Cysteine hydrochloride | 0.1 to 0.3 |
| Monosodium glutamate | 1 to 2 |
| Sodium alginate | 0.1 to 0.3 | and the balance water.

6. The meat wrapping sheet of claim 5 in which said sheet is of polyethylene.

7. The meat wrapping sheet of claim 5 in which the enzyme is papain.

References Cited in the file of this patent

UNITED STATES PATENTS

| 2,517,595 | Owens et al. | Aug. 8, 1950 |
| 2,604,244 | Tripp | July 22, 1952 |
| 2,611,708 | Owens et al. | Sept. 23, 1952 |

FOREIGN PATENTS

| 18,336 | Australia | Jan. 3, 1935 |

OTHER REFERENCES

"Refrigerating Engineering," February 1954, page 46, article entitled, Packaging and Wrapping Materials.